United States Patent Office 3,687,781
Patented Aug. 29, 1972

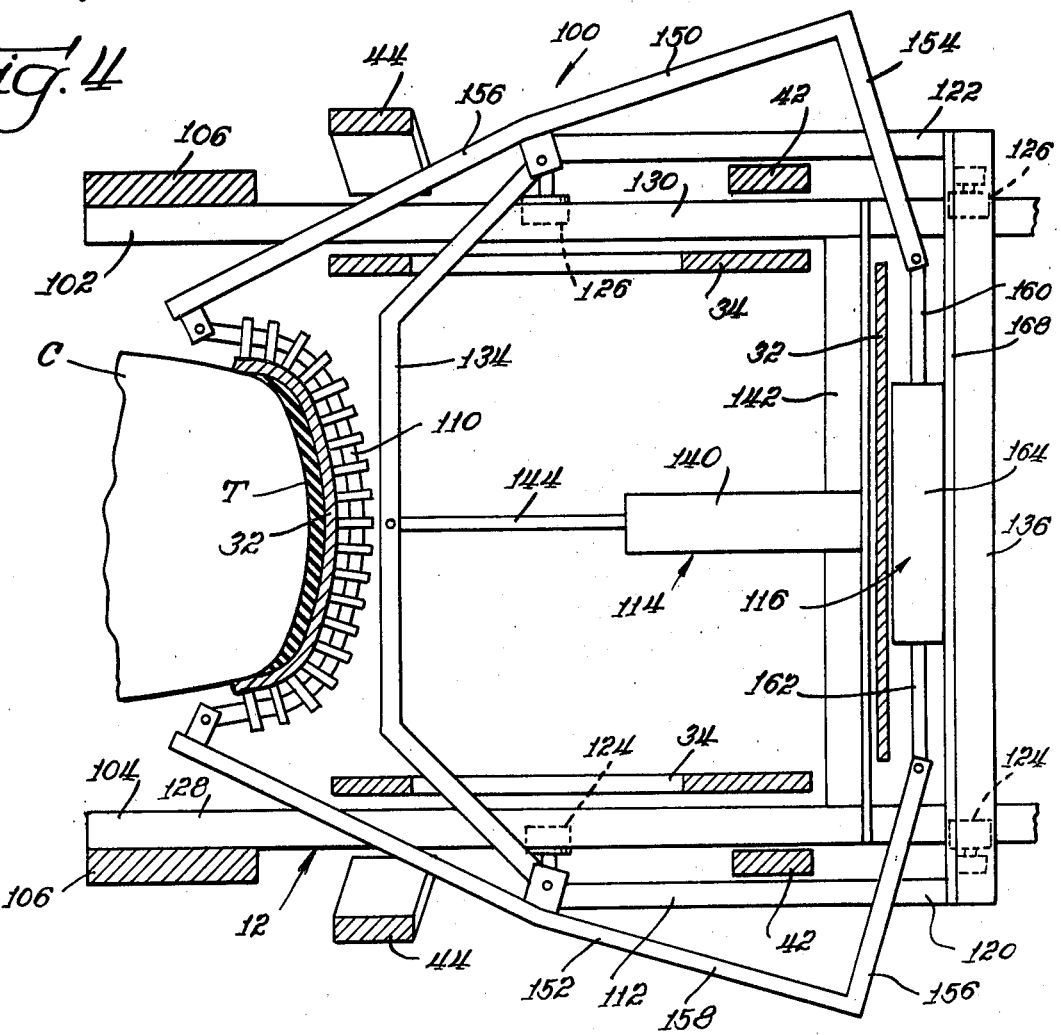

3,687,781
TIRE TREAD STITCHING APPARATUS
Vaughn Rawls and Walter B. Howard, Lima, Ohio, assignors to National-Standard Company, Niles, Mich.
Filed May 25, 1970, Ser. No. 41,152
Int. Cl. B29h 17/08, 17/37
U.S. Cl. 156—412                                             11 Claims

ABSTRACT OF THE DISCLOSURE

An apparatus for stitching tire tread material onto the peripheries of tire carcasses of different diameters within a given range of diameters, embodying an endless belt and means for bringing the endless belt into engagement with the strip material to properly stitch the same to the periphery of the tire carcass.

BACKGROUND OF THE INVENTION

This invention relates to an apparatus for stitching strip material onto the peripheries of annular rotatable objects, and more particularly, relates to an apparatus for stitching tire tread material onto the peripheries of tire carcasses.

In stitching a strip of tire tread material onto the periphery of a tire carcass, it is essential that the stitching be carried out in a manner to prevent entrapment of air between the tire tread material and the tire carcass. Another important requirement of a tire stitching apparatus is that the pressure roll means provided to apply pressure to the tread material is designed to apply a uniform pressure across the width of the strip material to provide good adherence of the tread material to the tire carcass. A tire stitching apparatus of this type is disclosed in co-pending application, Ser. No. 721,991, of Leon J. Cole, filed Apr. 17, 1968, which issued as Pat. No. 3,556,902 on Jan. 19, 1971. The Cole stitching apparatus provides a very satisfactory stitching operation. The only disadvantage with the apparatus disclosed in this application is that the means for applying the pressure to the tread material to provide good adherence of the said material to the tire carcass are composed of several components which must be carefully aligned with respect to each other so that a uniform pressure is applied across the crown of the annular tire and the adjacent wing portions.

This invention avoids the foregoing mentioned problem by using a single flexible pressure roller means which applies a uniform stitching pressure across both wing portions and the crown portion of a tire carcass.

One important feature of this invention is the particular construction of the roller belt which is used for applying a uniform pressure to stitch the tire tread material to the tire carcass. This belt is constructed of disc roller members rotatably mounted along the length of a flexible core member, where the disc rollers have a uniformly decreasing size in either direction from the middle of the roller belt.

Another important feature of this invention is the power operating mechanism used to move the roller belt forwardly towards the tire carcass to apply the proper stitching pressure. This power operating assembly moves radially towards the rotating tire carcass such that the middle portion of the roller belt strikes the crown portion first and thereafter the opposite ends of the roller belt are swung inwardly toward the tire carcass causing the roller belt to follow the convex configuration of the crown portion of the tire carcass and the opposite wing portions of the tire carcass.

By virtue of this invention, stitching is carried out in a manner to prevent any entrapment of air between the tire tread material and the tire carcass and additionally, a uniform pressure is applied across the crown portion and adjacent wing portions of a sufficient magnitude to provide good adherence of the tread material to the tire carcass.

DESCRIPTION OF DRAWING

For a better understanding of this invention, reference may be had to the accompanying drawing, in which:

FIG. 4 is a plan view of the FIG. 1 illustration;

FIG. 5 is a plan view of the stitching roller belt used in this invention;

FIG. 6 is an enlarged partial view of FIG. 5; and

FIG. 7 is a modification of FIG. 6.

DESCRIPTION OF PREFERRED EMBODIMENT

Figure 1:
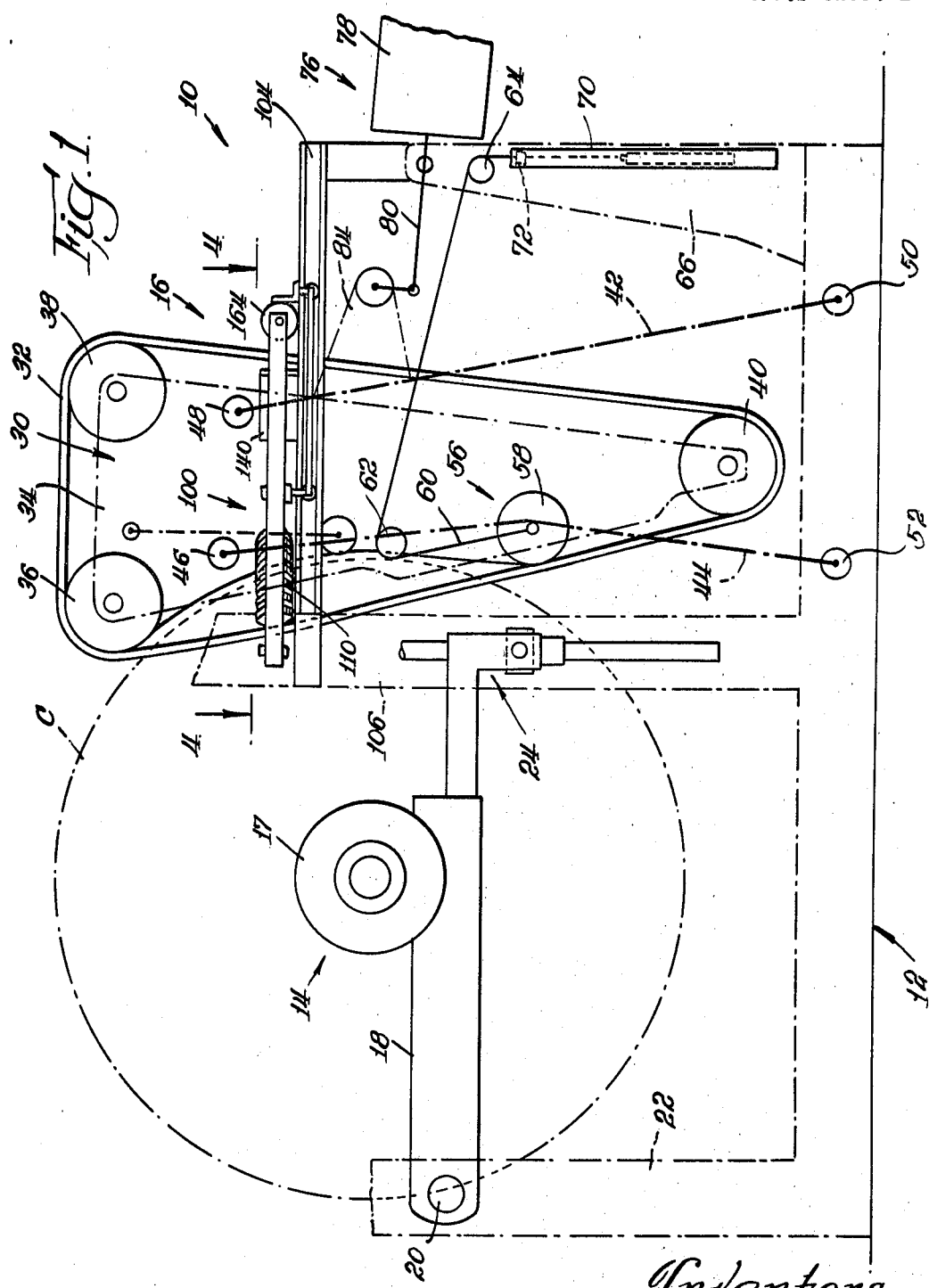
FIG. 1 is a side elevational view illustrating the preferred embodiment of this invention in combination with a stitching apparatus.
Figure 2:
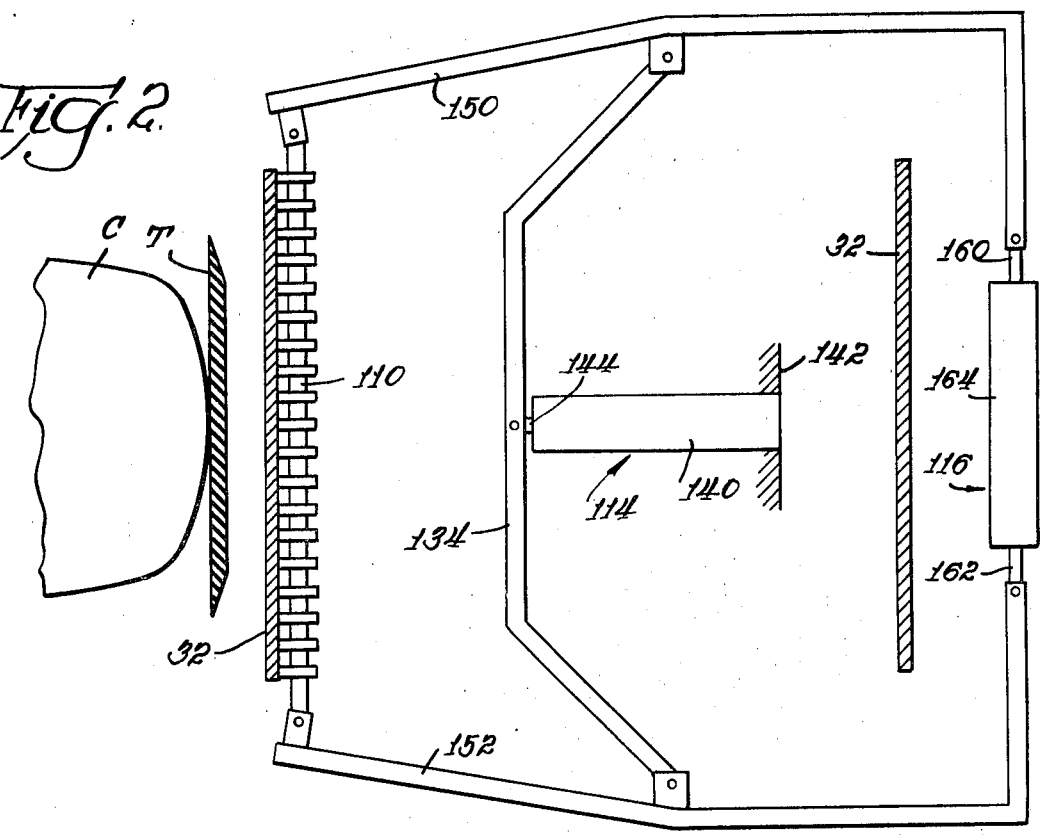
FIG. 2 is a plan view of the preferred embodiment of this invention shown in the non-stitching position.
Figure 3:
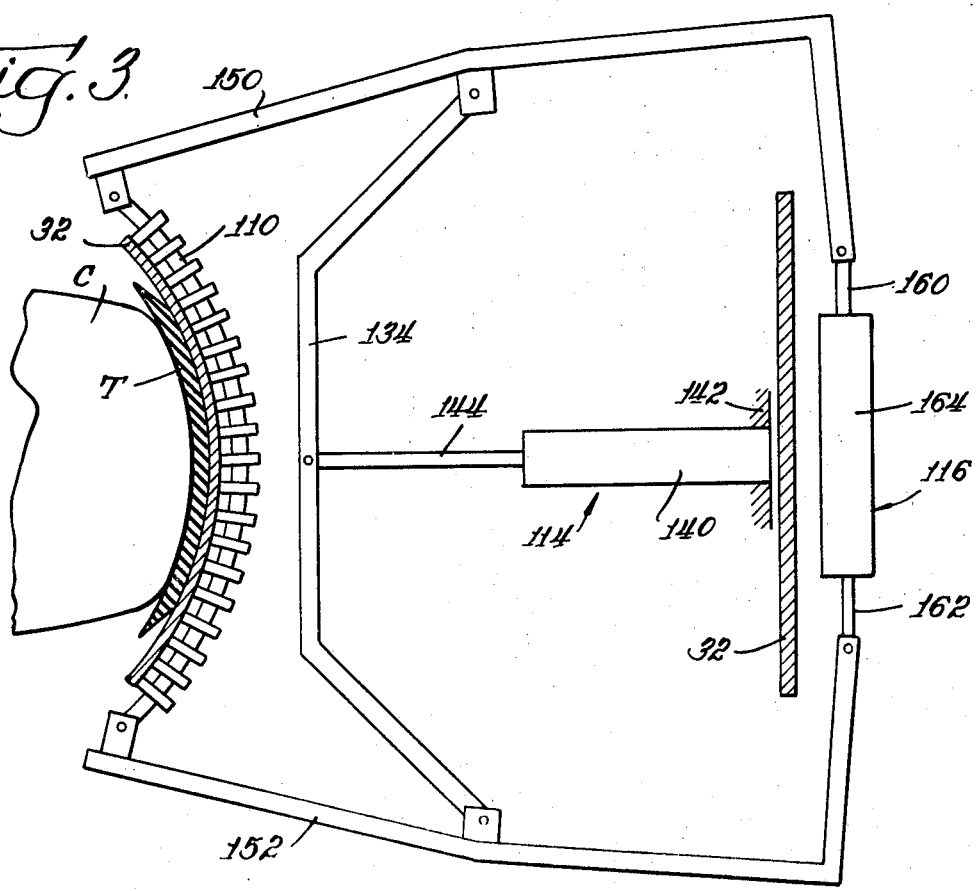
FIG. 3 is the same as FIG. 2 with the position of parts illustrated in the stitching position.

Referring to FIG. 1, there is shown a stitching apparatus embodying the principles of this invention and generally designated by the reference numeral 10. The stitching apparatus 10 is assembled on a main frame 12, which provides support for a chuck unit 14 and a stitching unit 16.

The chuck unit 14 includes a radially expansible and contractible chuck 17 for supporting a tire carcass or casing C (indicated by dotted lines) for rotation about its rotational axis. The tire carcass or casing C may be of any given diameter within a given wide range of diameters. The chuck 17 may be of the construction shown and described in U.S. Pat. No. 2,960,130, dated Nov. 15, 1962, J. A. Smyser, which provides for supporting tire carcasses of a wide range of sizes. The tire carcass is mounted on the chuck 17 in the collapsed position thereof and after which the chuck 17 is radially expanded to firmly hold the tire carcass. As shown and described in the above-mentioned Smyser patent, the tire carcass upon being mounted on the chuck, is charged with air under pressure, or otherwise firmly supported such that its outer peripheral surface is maintained firm for the application of tire tread material to its crown and adjoining wing portions.

The chuck 17 is mounted on a box-like frame member 18, whose fixed end is pivotally mounted on a shaft 20 extending transversely between a pair of upright posts 22 (only one being shown) at the front of the main frame 12. Chuck adjusting screw means 24 is operatively associated with the other end of the frame 18 to raise or lower the free end of the frame about the axis of pivot shaft 20 for adjusting the position of the axis of rotation of the chuck 16. The purpose of the chuck adjusting screw means 24 is to permit the rotational axis of the tire carcass mounted on chuck 16 to be moved both laterally and vertically with respect to the stitching unit 16 for accommodating a wide range of tire carcass sizes. A complete disclosure of the chuck adjusting screw means 24 is given in the above-identified co-pending Cole patent application.

The stitching unit 16 includes an endless belt frame means 30 for supporting an endless belt 32 laterally of the chuck 17 to provide for stitching of tread material to the periphery of the tire carcass C supported on the chuck 17. The endless belt frame means 30 is defined by a pair of spaced-apart side frame members 34 which support a pair of upper belt guide rollers 36 and 38 between the upper ends thereof and a lower belt guide roller 40 between the lower ends thereof.

The side frame members 34 are supported on the main frame 12 by a suspension means comprising a pair of rocker arms 42 and 44 (shown schematically in FIG. 1) at each side of a line outwardly of the side frame members 34 (see FIG. 4). The rocker arms 42 are pivotally mounted at their upper ends on a pivot shaft 48 extending laterally outwardly of side frame members 34 and at their lower ends are pivotally mounted at 50 on main frame 12. Similarly, the rocker arms 44 are pivotally mounted at their upper ends on pivot shafts 46 extending laterally outwardly of the side frame members 34, and at their lower ends are pivotally mounted at 52 on the base of the main frame 12. The distance between the pivots 46 and 48 at the upper ends of the rocker arms 42 and 44 are spaced more closely together than the pivots 50 and 52 at the lower ends of the rocker arms 42 and 44, respectively, to provide a rocking action to the belt frame means 30 before the run of the endless belt 32 is engaged with a tire carcass C on the chuck 17 to properly position the belt 32 with respect to the tire carcass C.

The stitching unit 16 also includes belt displacement means 56 comprising a belt displacement roller 58 rotatably mounted and adapted to move towards and away from upper roller 36 by means of a chain drive arrangement. This chain drive arrangement is constituted by a pair of chains 60 connected at the opposite ends of the roller 58, which are trained over sprockets 62 and from there extend over a second pair of sprockets 64 rotatably mounted on a pair of spaced-apart vertical standards 66 fixed rearwardly to the base of the main frame 12. The other end of the chains 60 extend into channel members 70 fixed to and lying inwardly of the pair of spaced-apart standards 66. A stop member 72 is secured in a predetermined position within each of the channel members 70 for engaging the ends of the chains to anchor or arrest the movement of such inner ends. For a more detailed description and showing of the belt displacement means 56 and its operation, reference may be had to the above-identified Cole patent application.

To displace the endless belt means 30 between its rearward non-stitching position and its forward stitching position, a first power operating means 76 is provided, which comprises a piston and cylinder assembly 78 pivotally supported by the vertical standards 66 and having its piston rod 80 interconnected to a rearwardly extending bracket member 84 secured to rocker arm 42. The actuation of the piston and cylinder assembly 78 causes the endless belt frame 30 to be moved toward and away from the chuck 17 for displacing the endless belt means 30 between its two positions.

The foregoing described portion of the stitching apparatus depicted in FIGS. 1 and 4 forms no part of this invention and is completely described and shown in the above-identified Cole patent application.

This invention is directed to a pressure roller belt assembly 100, which is supported on the main frame 12 by two parallel channel members 102 and 104, whose opposite ends are supported between a pair of vertical posts 106 of main frame 12 and the upper end of the pair of vertical standards 66. The pressure roller belt assembly 100 includes a roller belt 110 disposed across and directly behind the endless belt 32. A carriage frame 112 supports the ends of the roller belt 110 and conveys the roller belt towards and away from the chuck 17.

The carriage 112 (FIG. 4) comprises two side bars 120 and 122 on which are mounted, respectively, a pair of guide wheels 124 and 126. The guide wheels 124, 126 are disposed downwardly and laterally inward of the side bars 120, 122, and are adapted to ride along the tracks 128 and 130, respectively, formed in the pair of channel members 104, 106. The forward end of the side bars 120, 122 are connected together by a U-shaped cross bar 134 and their rearward ends are interconnected by an elongated cross bar 136.

To convey the carriage frame 112 along the channel tracks 128, 130, an advance piston and cylinder unit 114 is provided having its cylinder 140 mounted to a stationary cross bar 142 and its piston rod 144 fastened perpendicularly to the middle of the U-shaped cross bar 134. The stationary cross bar 142 is secured between the channel members 102, 104 at such a position that the piston rod 144 in the retracted position will withdraw the roller belt 110 away from the chuck 17 a sufficient distance to permit the largest tire size carcass C that can be accommodated by the stitching apparatus to be conveniently placed and removed from the chuck 17.

In order to bring the ends of the roller belt 110 toward the sidewall of the tire carcass C, a pair of L-shaped arms 150 and 152 are connected to the ends of the roller belt 110 and pivotally mounted to the carriage 112 at the forward end of the side bars 120 and 122. To selectively move the ends of the roller belt 110 towards and away from the sidewall of the tire carcass C, a sidewall piston and cylinder unit 116 is provided having a pair of conjointly acting piston rods 160 and 162 pivotally connected to the ends of the short segments 154 and 156, respectively, of the L-shaped arm members 150 and 152 in order to cause the arm members to pivot about the mid-portion of their long segments 156 and 158, respectively. The cylinder 164 of the piston and cylinder unit 116 is secured along its length to a vertical flange 168 of elongated cross bar 136 at the rearward end of the carriage 112 to be carried therewith.

As illustrated in FIGS. 5 and 6, the roller belt 110 has a generally tubular outline and more particularly a barrel-shaped outline, which is very effective as a stitching tool. The roller belt 110 is formed on a flexible strong elongated core member 170, for example a wire cable material, that is embedded in a tubular-shaped flexible material 172, such as molded rubber. A plurality of disc-shaped rollers 174 are rotatably supported at staggered even intervals along the length of the tubular member 172. Each disc roller 174 is rotatably supported in an annular groove 176 formed in the tubular flexible material 174 and rotatably supported therewith by a bearing 176, such as a pin bearing. To permit the roller belt 110 to flex through a large angle, the tubular flexible material 172 is provided with a plurality of V-shaped annular recesses 178 in the space between adjacent disc rollers 174. For coupling the roller belt 110 to the arm members 150, 152, the opposite ends of the belt are provided with cable fasteners 180.

To ensure that there is no entrapment of air bubbles by the engagement of the roller belt 110, the diameter of the plurality of roller discs 174 is selected to decrease in a uniform rate from the middle towards each end. In this way the first engagement of the belt 110 with the tire carcass C is in the center of its crown portion.

Alternatively, the roller belt member 110 could be constructed in the form illustrated in FIG. 7, where the roller discs 180 are integrally formed with the molded material 182. In this modification, the elongated body of molded material 182 has a circular-shaped opening formed lengthwise through its center and a flexible cable 184 is loosely threaded therethrough to permit the disc 180 to rotate thereabout.

OPERATION

Referring to FIG. 1, an annular object such as a tire carcass C to which strip material, such as tire tread material, is to be stitched is assembled on the chuck 17, and the chuck is then expanded and thereafter the tire carcass is inflated. For a large diameter tire carcass such as illustrated in FIG. 1, the screw adjustment means 14 would be set to the position illustrated in FIG. 1.

The tread material is then applied around the tire carcass periphery by rotating the chuck 17 by means of an electric motor (not shown) carried on box frame 18. After one revolution of the tire carcass, the motor is stopped and the tread material from the supply source is then severed. The splice is then formed by the operator between the leading end of the tread material and the severed end from the supply source. This splice may, if desired, be hand-stitched with known tools for this purpose.

Thereafter, the piston and cylinder assembly 78 is energized to move the endless belt means 30 from the retracted position to the stitching position shown in FIG. 9, to thereby cause the run of the belt 32 between the belt roller 36 and belt displacement roller 58 to be displaced into engagement with the tire carcass material mounted on the carcass C.

As the endless belt means 30 moves to the stitching position, the belt displacement roller 58 is moved toward belt roller 36 upon engagement of the ends of chains 60 with the stop members 72 to effect movement of the ends of the shaft carrying roller 58 until it reaches the proper stitching relation with the tire carcass C.

As the piston and cylinder assembly 76 moves the endless belt means 30 into stitching position with respect to the tread material T on the inflated tire carcass C, the advance piston and cylinder unit 114 is actuated in a direction to move the carriage 112 forwardly to cause the roller belt 110 to be positioned across the endless belt 32. The roller belt 110 strikes the run of the endless belt 32 initially at its mid-portion and with continued forward movement forms the endless belt 32 into an arcuate configuration in its lengthwise and transverse directions conforming substantially to the configuration of the tread material on the inflated tire carcass. The advance cylinder 140 continues to extend the piston rod 144 to move the carriage 112 forwardly until such time as it reaches its pressure capacity. At this point, the sidewall piston and cylinder unit 116 is energized in a direction to cause the pair of piston rods 160, 162 to move outwardly and cause the arm members 150 and 152 to bring the opposite ends of the roller belt 110 towards the opposite sidewalls of tire carcass C. This inward displacement of the ends of the roller belt 110 ensures that the tire tread material T is properly stitched to the adjacent wing portions of the tire carcass crown. Thus, upon rotation of the tire carcass C, the tread material T on the periphery thereof is pressure stitched to the periphery of the carcass.

The chuck 17 may be rotated one or more times to thus apply the tire tread material to the tire carcass. After the stitching has been completed, the sidewall cylinder 164 is energized in a reverse direction to cause the ends of the roller belt 110 to move away from the tire carcass and thereafter the advance cylinder 140 is energized to retract the carriage 112 to the non-stitching position. The piston and cylinder assembly 176 may simultaneously be actuated to retract the endless belt means to its retracted position. The tire carcass on the chuck is then removed. The components of the stitching apparatus are then in their original starting positions for applying tread material to another tire carcass or casing.

From the foregoing description, it can be seen stitching is carried out in a manner to prevent any entrapment of air between the tire tread material and the tire carcass. The pressure roller belt assembly of this invention applies a uniform pressure across the crown portion and adjacent wing portions of a sufficient magnitude to provide good adherence of the tread material to the tire carcass.

We claim:

1. In an apparatus for stitching tire tread material onto the periphery of a rotatably mounted tire carcass, a pressure roller belt assembly for applying a uniform pressure across the tread portion of a tire carcass, comprising a roller belt having an elongated flexible core member of a length substantially greater than the distance across the tread portion of a tire carcass and having roller means of a generally tubular outline extending lengthwise of and rotatably mounted on said core member, and carriage means for supporting the ends of said roller belt and for moving said roller belt radially inwardly to a stitching position relative to said rotatably mounted tire carcass and for moving the ends of said roller belt towards the opposite sidewalls of the tire carcass upon said roller belt being moved to said stitching position to apply a uniform pressure across its crown portion and adjacent wing portions of a sufficient magnitude to provide good adherence of the tread material to the tire carcass.

2. The pressure roller assembly as defined in claim 1 wherein said roller means comprises a plurality of circular disc members rotatably mounted along the length of said flexible core member at even spaced intervals.

3. The pressure roller assembly as defined in claim 2, wherein said circular disc members uniformly decrease in diameter from the midpoint of said flexible body portion towards its opposite ends.

4. The pressure roller assembly as defined in claim 2, wherein said circular discs are integrally joined together to form an elongated structure with a circular opening provided lengthwise through its center of a diameter slightly larger than the diameter of said flexible core member.

5. A pressure roller belt assembly defined in claim 1, wherein said carriage means comprises a carriage frame having guide means for moving said carriage frame directly toward and away from said rotatably mounted tire carcass along a trackway, a pair of spaced-apart arm members carried by said carriage frame and having fastener means attached to the ends of said roller belt for holding said roller belt across the path of the tread portion of said rotatably-mounted tire carcass, and a power operated means for moving said carriage frame between a retracted position and said stitching position.

6. In an apparatus for stitching tire tread material onto the periphery of a rotatably mounted tire carcass, a pressure roller belt assembly for applying a uniform pressure across the tread portion of a tire carcass, comprising a roller belt having an elongated flexible body portion of a length substantially greater than the distance across the tread portion of a tire carcass, and having roller means of a generally tubular outline extending lengthwise of and adapted to turn about said body portion, and carriage means for supporting the ends of said roller belt and for moving said roller belt to a stitching position relative to said rotatably mounted tire carcass for applying a uniform pressure across its crown portion and adjacent wing portions of a sufficient magnitude to provide good adherence of the tread material to the tire carcass, said carriage means comprises a carriage frame having guide means for moving said carriage frame directly toward and away from said rotatably mounted tire carcass along a trackway, a pair of spaced-apart arm members carried by said carriage frame and having fastener means attached to the ends of said roller belt for holding said roller belt across the path of the tread portion of said rotatably-mounted tire carcass, a power operated means for moving said carriage frame between a retracted position and said stitching position, means for pivotally mounting said pair of arm members intermediate their ends on said carriage frame with the pair of ends extending toward said rotatably mounted tire carcass carrying said fastener means and a second power operated means for moving the opposite pair of ends of said arm members towards and away from each other to permit the ends of said roller belt to be brought towards the opposite sidewalls of the tire carcass upon said roller belt being moved to said stitching position.

7. In an apparatus for stitching tire tread material onto the periphery of a rotatably mounted tire carcass, a pressure roller belt assembly for applying a uniform pressure across the tread portion of a tire carcass, comprising a roller belt having an elongated flexible core, member of a length substantially greater than the distance across the tread portion of a tire carcass and having roller member of a generally barrel-shaped outline extending lengthwise of and rotatably mounted on said core member, and carriage means for supporting the ends of said roller belt and for moving said roller belt radially inwardly to a stitching position relative to said rotatably mounted tire carcass and for moving the ends of said roller belt towards the opposite sidewalls of the tire carcass upon said roller belt being moved to said stitching position to apply a uniform pressure across its crown portion and adjacent wing portions of a sufficient magnitude to provide good adherence of the tread material to the tire carcass.

8. The pressure roller assembly as defined in claim 7, wherein said roller member comprises a plurality of circular discs rotatably mounted along the length of said flexible core member at even spaced intervals, where the diameter of said discs decreases uniformly from the midpoint of said flexible core member towards its opposite ends.

9. In an apparatus for stitching tire tread material onto the periphery of a rotatably mounted tire carcass, a pressure roller belt assembly for applying a uniform pressure across the tread portion of a tire carcass, comprising a roller belt having an elongated flexible body portion of a length substantially greater than the distance across the tread portion of a tire carcass and having roller member of a generally barrel-shaped outline extending lengthwise of and adapted to turn about said flexible body portion, and carriage means for supporting the ends of said roller belt and for moving said roller belt to a stitching position relative to said rotatably mounted tire carcass for applying a uniform pressure across its crown portion and adjacent wing portions of a sufficient magnitude to provide good adherence of the tread material to the tire carcass, said flexible body portion comprising a length of a flexible metal cable embedded in the case of a flexible tubular member, said flexible tubular member has a plurality of annular grooves formed at spaced even intervals along its length to receive and hold said circular discs and bearing means seated in each of said annular grooves for rotatably mounting said circular discs.

10. The pressure roller assembly as defined in claim 9, wherein said flexible tubular member further includes a plurality of V-shaped annular grooves between said plurality of annular grooves to permit said roller belt to flex through a wide range.

11. In an apparatus for stitching tire tread material onto the periphery of a rotatably mounted tire carcass, a pressure roller belt assembly for applying a uniform pressure across the tread portion of a tire carcass, comprising a roller belt having an elongated flexible body portion of a length substantially greater than the distance across the tread portion of a tire carcass and having roller member of a generally barrel-shaped outline extending lengthwise of and adapted to turn about said flexible body portion, and carriage means for supporting the ends of said roller belt and for moving said roller belt to a stitching position relative to said rotatably mounted tire carcass for applying a uniform pressure across its crown portion and adjacent wing portions of a sufficient magnitude to provide good adherence of the tread material to the tire carcass, said carriage means comprising a carriage frame having guide means for moving said carriage frame directly toward and away from said rotatably mounted tire carcass along a trackway, a pair of spaced-apart arm members pivotally mounted intermediate their ends on said carriage frame with the ends extending toward said rotatably mounted tire carcass carrying fastener means for attaching the ends of said roller belt such that said roller belt is held across the path of the tread portion of said tire carcass and with the ends extending away from said tire carcass coupled together by a first power operated means for moving said fastener means towards and away from each other upon said roller belt being moved to said stitching position, and a second power operated means for moving said carriage frame between a retracted position and said stitching position.

References Cited

UNITED STATES PATENTS 3,556,902    1/1971    Cole _____ 156—412
1,834,559    12/1931    Waner _____ 156—412

STEPHEN C. BENTLEY, Primary Examiner

U.S. Cl. X.R.

156—421